Sept. 6, 1932.     F. K. GRUSS     1,875,723
VACUUM BRAKE
Filed March 26, 1928     2 Sheets-Sheet 1
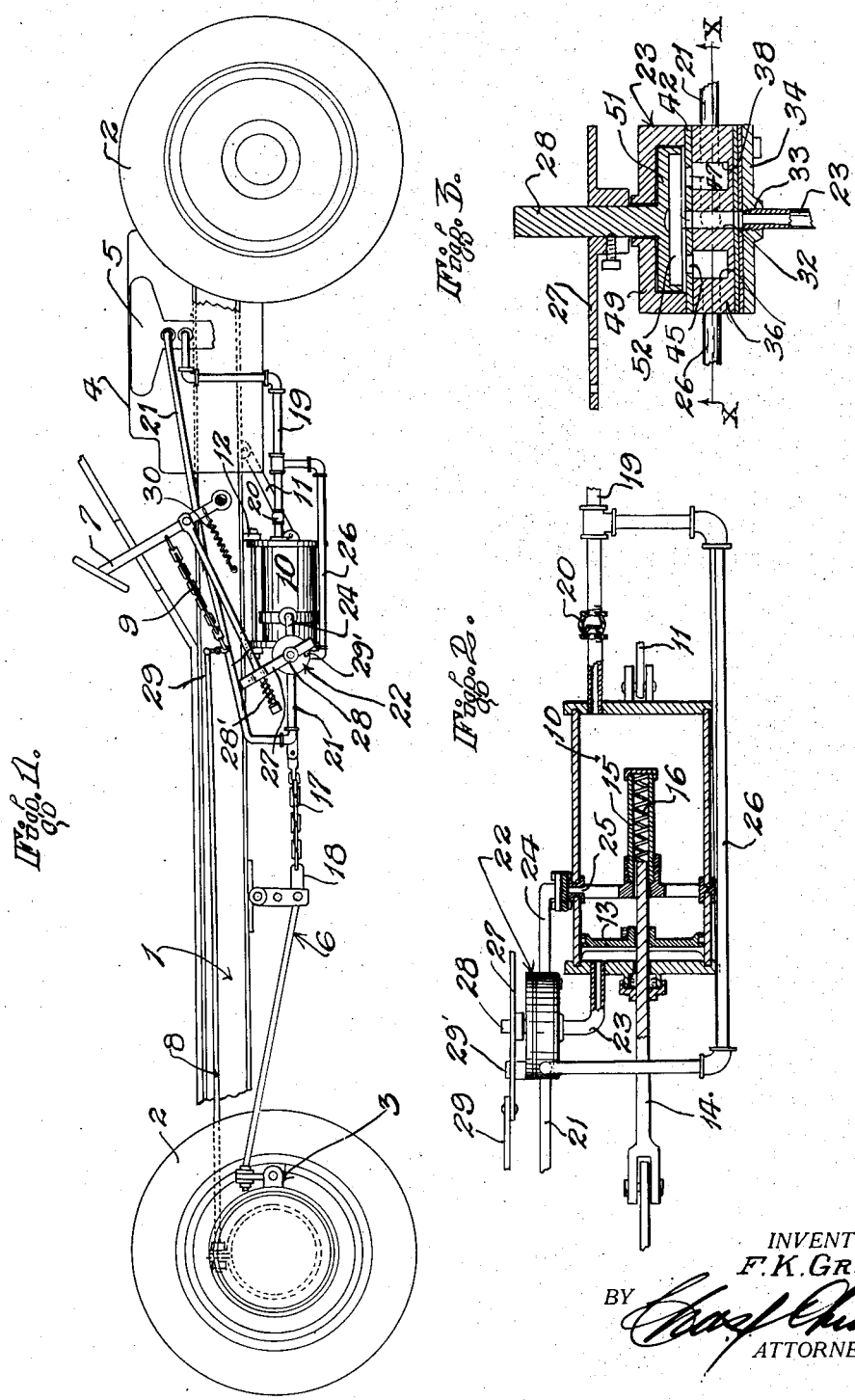
INVENTOR.
F. K. GRUSS
BY
ATTORNEY Sept. 6, 1932.  F. K. GRUSS  1,875,723
VACUUM BRAKE
Filed March 26, 1928  2 Sheets-Sheet 2
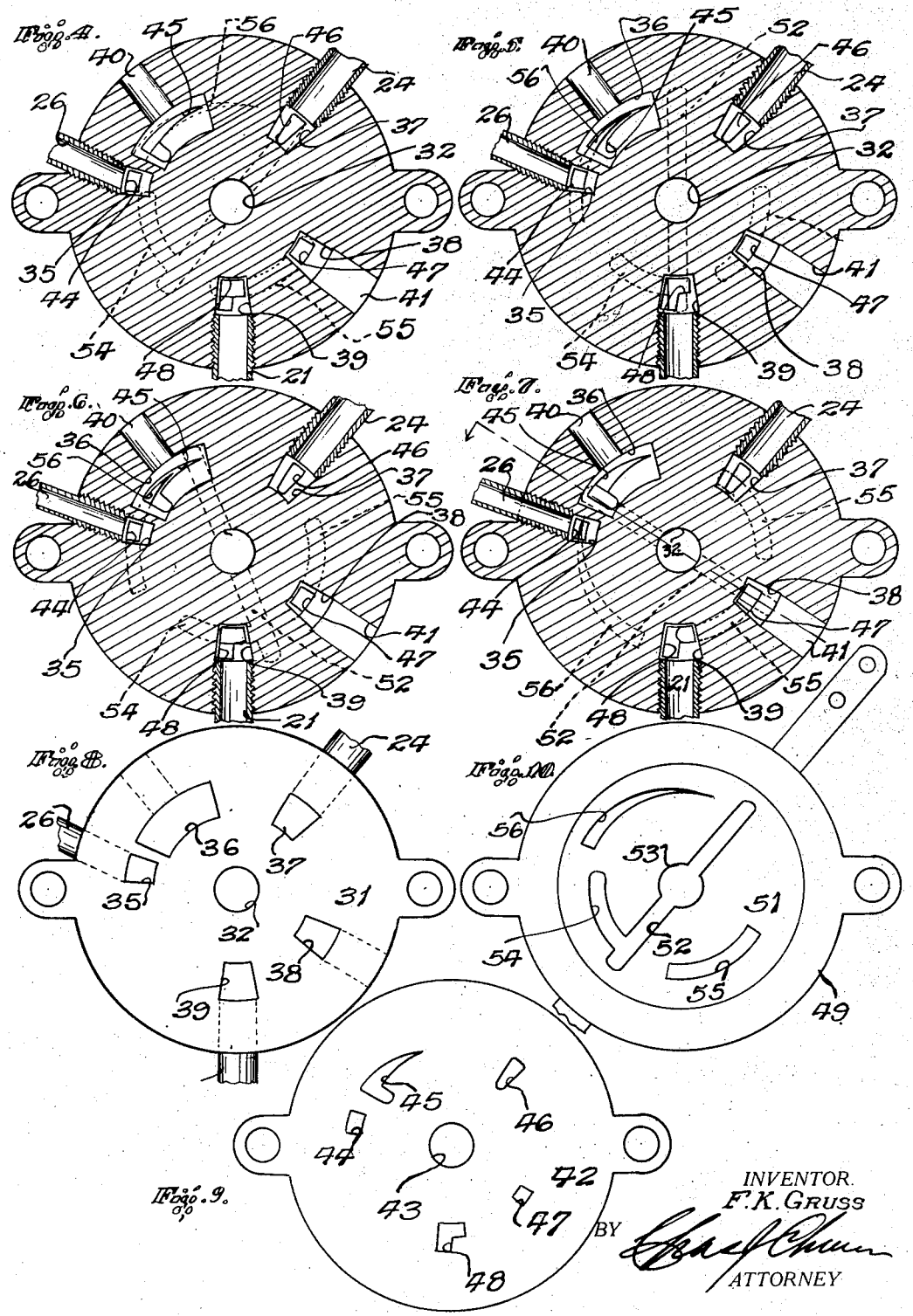
INVENTOR.
F. K. GRUSS
BY
ATTORNEY Patented Sept. 6, 1932

1,875,723

UNITED STATES PATENT OFFICE

FRANCIS K. GRUSS, OF REDWOOD CITY, CALIFORNIA, ASSIGNOR TO LUCIEN ABADIE, OF BERKELEY, CALIFORNIA, FRANCIS J. GRUSS AND FRANCIS K. GRUSS, BOTH OF REDWOOD CITY, CALIFORNIA, TRUSTEES

VACUUM BRAKE

Application filed March 26, 1928. Serial No. 264,736.

This invention relates to improvements in automobile brakes of the vacuum operated type such as disclosed in United States Letters Patent issued to me and numbered 1,714,868 and 1,742,444.

The vacuum brakes of the type disclosed in my previous applications for patent were constructed so that the operation and control of the brakes were effected by admitting a regulated amount of atmospheric air into a part of the working cylinder in communication with the intake manifold of the internal combustion engine. Although this introduction of atmospheric air into the brake apparatus and engine is highly desirable in order to effectively and reliably control the braking operation, yet it proves objectionable in certain instances in that it alters the combustible mixture and causes the motor to operate irregularly or to "stall."

It is the primary object of the present invention to provide a vacuum brake of the character described which will have all of the advantages of my previous brakes but which will eliminate the objections previously encountered by causing a predetermined amount of atmospheric air to enter the internal combustion engine through the intake manifold at all times regardless of whether the brake is in inoperative or operative condition.

One of the purposes of the invention is to provide an improved valve mechanism which may be easily and accurately operated through the simple expediency of depressing or otherwise moving a pedal or like operating member, the said valve mechanism providing for an advantageous operation and control of the brakes as above pointed out.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Fig. 1 represents a fragmentary side elevation of an automobile showing the same equipped with the brake apparatus of my invention, the brakes being fully applied.

Fig. 2 represents an enlarged longitudinal sectional view through the main part of the mechanism of this invention.

Fig. 3 represents a vertical sectional view of the valve mechanism as when assembled, taken on plane of line 3—3 of Fig. 7.

Fig. 4 represents a sectional view of the valve showing the parts thereof in position when the brake is in off position, said section being taken on the line X—X of Fig. 3.

Fig. 5 represents a sectional view taken on the line X—X of Fig. 3, showing the valve in position when one of the two vacuum pipe connections between the cylinder and intake manifold is cut out and the other one is cut in with the cylinder and the brakes being still in off position.

Fig. 6 represents a sectional view taken on the plane line X—X of Fig. 3 showing the valve in position when the brakes are beginning to be applied, as in a light application of the brakes.

Fig. 7 is a sectional view on line X—X of Fig. 3, showing the valve in position when the brakes are fully applied.

Fig. 8 represents a top plan view of a part of the valve mechanism.

Fig. 9 represents a top plan view of the valve plate.

Fig. 10 represents a top plan view of the rotatable valve element shown mounted in the casing therefor.

The embodiment of the invention that is illustrated in detail in the accompanying drawings, is shown as applied to an automobile of which there is shown in Fig. 1 a frame or chassis 1, wheels 2, wheel carrier brake mechanism 3 consisting of service and emergency brake apparatus, internal combustion engine 4, intake manifold 5, brake rigging 6, brake pedal 7, emergency brake rigging 8 coupled by flexible element 9 to the brake pedal.

The apparatus of my invention includes a cylinder 10 suitably mounted on the frame 1 of the automobile by fastening elements 11 and 12. A piston 13 is reciprocally mounted within the cylinder and is fixed on a piston rod 14 which is extended beyond the piston into a tubular bearing 15, in which bearing an expansion spring 16 is contained, said piston sliding into the bearing against the action of the spring. The outer end of the piston rod is connected by means of a flexible connecting element 17 such as a chain, with the crank arm 18 forming a part of the brake rigging 6.

Extending from the front end of the cylinder 10 where it communicates with that portion of the cylinder, is a pipe line 19 connected with the intake manifold 5, there being a check valve 20 of any conventional type in said pipe line and arranged so that said valve will close on cessation of the operating suction force in pipe 19. Extending from the manifold 5 is another suction pipe line 21 which, through the especially constructed valve 22 of this invention, communicates with the rear end of the cylinder by means of a short pipe 23. A short pipe 24 communicates with the cylinder at a point between its ends, through an opening 25 and leads to the valve 22 where, through the valve, it may be communicated with the rear end of the cylinder by pipe 23. Another pipe line 26 leads from the valve 22 to pipe 19 where it is communicated with said pipe at a point between the check valve and the intake manifold.

The valve 22 has a crank arm 27 mounted on its stem 28, with which crank arm a link 29 is slidably connected. A spring 28' is interposed between a stop on the outer end of the link and said crank. A stop 29' is provided on the valve to limit movement of the crank arm. The link 29 extends upwardly to and is connected with the pedal 7 on the foot board, whereby on depressing the pedal against the action of the usual spring 30, link 29 and crank arm 27, will cause the valve to be operated.

The valve comprises a circular body 31 having a central opening 32 registering with a similar opening 33 provided in a plate 34 bolted onto the under side of the body, the opening 33 being screw threaded and adapted to receive the pipe 23. Cut into the body from the upper face thereof are arcuate recesses designated 35, 36, 37, 38 and 39, which recesses are arranged in a circular series around the central opening 32. These recesses are tapped through the periphery of the body, and communicating with the recesses 35, 37 and 39 are the pipes 26, 24 and 21 respectively, whereas the other recesses 36 and 38 are merely connected with the atmosphere by the ports 40 and 41. A stationary valve plate 42 is mounted upon the upper side of the body 31 and has a central opening 43 which registers with the opening 32. Arranged in a circular series about the opening 43 and adapted to communicate with the recesses in the body 31, are valve plate ports 44, 45, 46, 47 and 48. Mounted on the upper side of the valve plate is a valve casing 49 which houses a rotary disk valve 51, projecting upwardly from which is the valve stem 28. The valve 51 is provided in its under face with a groove port 52 extending transversely across the center of the valve with its ends spaced from the periphery. In the center of this groove and centrally of the valve is a circular enlargement 53 of the groove, which enlargement is adapted to register with openings 32 and 43 of the valve body and valve plate respectively.

Extending from one end of the groove 52 is an arcuate groove 54, the purpose of which will be later described. At a point spaced from the groove 52 is a shorter arcuate groove 55 adapted to register with the ports or openings 47 and 48 of the valve plate and with the recesses 38 and 39 of the valve body 31.

Another arcuate groove 56 is formed in the valve and is arranged to cooperate with the ports 44 and 45 and recesses 35 and 36.

The groove 56 is gradually reduced in width, being tapered from one end to the other. In this connection it will be noted that the port 45 is slightly tapered from the L-shaped end thereof to a pointed end. The tapering of these ports is for the purpose of gradually increasing and decreasing the amount of atmospheric air entering the system.

*Operation*

The valve is normally held in position shown in Fig. 4 by the spring attached to the foot pedal, and when in this position the groove port 55 (dotted in this figure) in the valve is in registration at its ends with the ports 47 and 48 of the valve plate and with the recesses 38 and 39 of the valve body. Atmospheric air enters through the port 41 in the valve body and passes through the recess 38, the port 47, groove 55, port 48, and pipe line 21 to the manifold of the engine. In this way, when the brake is in "off position" atmospheric air is being admitted into the engine. To compensate for this extraneous air going into the manifold, when the brake mechanism of this invention is installed upon an automobile, the carburetor, not shown, is adjusted to provide the proper mixture in consideration of the intaking of this atmospheric air through the brake system. When the valve is in position shown in Fig. 4, the groove 52 of the valve registers at one end with the port 46 of the valve plate and as this port registers with the recess 37, to which the pipe 24 is connected, and the enlargement 53 of the passage 52 registers with the openings 43, 32, pipe 23 and rear end of the cylinder, the suction force from the motor is transmitted as follows: through the pipe line 19, front part of the cylinder 10, port 25, pipe 24, recess 37, port 46, groove 52, openings 43 and 32, and pipe 23. In this way an equal suction force is provided on opposite sides of the piston within the cylinder, and the brake mechanism is established in condition for operation. At this time, as previously pointed out, atmospheric air is passing into the intake manifold through pipe 21.

To apply the brakes, the pedal is depressed and the valve is moved into the position shown in Fig. 5. In moving the valve into this position, the valve port 52 is moved clear of the port 46 and out of communication with the pipe 24 but the other end of the valve port 52 is moved into communication with the port 48. This establishes a suction force from the manifold to the rear end of the cylinder through the pipe 23, which pipe is at all times in communication with said port 52 in the valve. This then directly establishes communication between both ends of the cylinder and the intake manifold through the pipes 19 and 21, but in view of the fact that the movement of the valve communicates the valve port 56 with the ports 45 and 44, with which latter the pipe 26 is connected, atmospheric air is admitted through the port 40, the recess 36, port 45, grooved port 56, port 44, recess 35, pipe 26 which is connected to pipe 19, thereby carrying the atmospheric air into the manifold 5. This introduction of atmospheric air renders the suction force in the pipe 19 nil but in view of the fact that the connection of the pipe 26 with the pipe 19 is between the engine and the valve 20 and the valve 20 closes immediately that the suction force in the pipe 19 is rendered nil, the suction force in the front end of the cylinder 10 then operates against the piston to hold the piston in balance and against movement. Therefore the first movement of the valve from its closed or inoperative position is one which merely switches the atmospheric air intaking to the engine from the pipe 21 to the pipe 19 without in any way affecting the force within the working cylinder or causing movement of the piston.

On continuing the depression of the foot pedal to cause the application of the brakes, the valve is moved into position shown in Fig. 6, and when in this position the brakes are applied. In such position, the valve port 52 is moved into registration with the narrow end of the tapered port 45 in the valve plate. Atmospheric air then passes through the port 40, recess 36, port 45, valve port 52, and from thence through openings 43 and 32 into the pipe 23 to the rear end of the cylinder thereby breaking the vacuum so that the vacuum force in the other end of the cylinder becomes effective and moves the piston and piston rod to the right, thereby applying the brakes. However, atmospheric air also passes on from the port 52 in the valve, through the port 48 in the valve plate into the recess 39, and from thence out through the pipe 21 into the intake manifold. In this way, even though atmospheric air is admitted into the rear end of the cylinder to cause an application of the brakes, said end of the cylinder is maintained in communication with the source of suction force. By this arrangement minute, accurate control of the braking action may thus be had by slightly varying or lessening the extent of movement of the brake pedal, the valve being correspondingly moved. Although atmospheric air, when the valve is in position shown in Fig. 6, is also passed from the recess 36 through ports 45, 56 and 44, recess 35, and pipe 26, into the pipe line 19 and into the engine, this does not affect the operative suction force trapped in the front end of the cylinder 10 by the check valve 20. The amount of atmospheric air admitted in this way into the system through the pipe 19 is reduced proportionately to the amount of air passing into the engine through the pipe 21, due to the tapered ports 45 and 56 because on moving the valve to bring the port 52 thereof into registration with the larger part of the port 45 whereby to increase the amount of atmospheric air entering the pipe 21, there is a corresponding decrease in the amount of air entering the pipes 26 and 19 because the smaller end of the valve port 56 is being brought into registration with the plate port 45. In this way practically the same amount of air is admitted into the engine at all times. When the valve is finally brought into position shown in Fig. 7, as is required to fully apply the brakes, the valve port 52 is brought into registration at its ends with both atmospheric air intake ports 40 and 41 and the full application of the brakes is effected, because also at this time, the pipe 19 ceases to intake atmospheric air and directly applies the suction force from the engine to the front end of the cylinder thereby tending to give additional forward movement to the piston and to fully apply the brakes. This is caused by the port 56 being moved clear of the air intake port 45. However, to maintain the same amount of air coming into the engine, the leg 54 of the port 53 registers with the port 48 with which the pipe line 21 to the manifold is connected, and in this way atmospheric air is admitted into the rear end of the cylinder and into the engine through the pipe 21. In other words, the rear end of the cylinder is maintained in communication with the atmosphere and with the intake manifold at the same time whereby quick and reliable control of the brake mechanisms is had. Immediately upon releasing the brake pedal, the springs will move the parts including the valve, back into position shown in Fig. 4, thereby restoring the vacuum force on both sides of the piston and again establishing the brakes for operation.

When the valve is in position shown in Fig. 7, the movement of the crank arm 27 is limited by the stop 29' and on further depression of the pedal, the spring 28' compresses and permits the link to move without moving the valve. This movement of the brake pedal takes up slack in flexible connection 8 and through the emergency brake rigging applies the emergency brake. By this arrangement the operator is able at all times to properly operate the emergency brakes of the vehicle even if the vacuum brake apparatus of this invention should fail to work.

It will be noted that by the controlled admission of atmospheric air into the manifold 5 as effected with the apparatus of this invention, the volume of air entering the manifold is such that the suction force in the manifold is at no time reduced to a point that the apparatus will fail to apply the brakes. In installing the brake apparatus of my invention the carburetor air intake is adjusted to allow less air to enter the manifold and the amount of air entering the manifold through the pipes 19 and 21 makes up for the lesser amount of air entering through the carburetor whereby substantially the same amount of air enters the engine after installation of my invention as before such installation. Therefore as the ordinary carburetor permits air to enter the manifold without preventing the suction force from sucking fuel from the carburetor to the engine, it follows that the controlled admission of air into the engine through the pipe 21 when the brakes are applied will not prevent the suction force from causing the brakes to remain applied or to be actuated. Furthermore the check valve 20 acts as previously explained to maintain a partial vacuum in the cylinder 10 and this vacuum will result in operation of the brakes when air is admitted to the end chamber 10 opposite that in which the vacuum is maintained.

I claim:

1. In combination with a motor vehicle including an internal combustion engine and brake mechanism, a cylinder, a piston reciprocally mounted in the cylinder, a connection between the piston and the brake mechanism whereby reciprocation of the cylinder will apply and release the brakes, a valve having ports in communication with the atmosphere, a pipe connecting the intake manifold of said engine with one end of said cylinder, a check valve in said pipe preventing fluid flow to said end of the cylinder, a second pipe connecting said first pipe with said valve, a third pipe connecting said manifold with said valve, a fourth pipe connecting said valve with the said end of said cylinder, a fifth pipe connecting said valve with the opposite end of said cylinder, said valve being operable in one position to form communication between said manifold and both ends of said cylinder, and in another position to form communication between said manifold and one end only of the cylinder whereby suction will be applied to the piston and the brakes, said valve forming communication between the atmosphere and said manifold in both of said positions.

2. In combination with a motor vehicle including an internal combustion engine and brake mechanism, a cylinder, a piston reciprocally mounted in the cylinder, a connection between the piston and the brake mechanism whereby reciprocation of the cylinder will apply and release the brakes, a valve having ports in communication with the atmosphere, a pipe connecting the intake manifold of said engine with one end of said cylinder, a check valve in said pipe preventing fluid flow to said end of the cylinder, a second pipe connecting said first pipe and said valve, a third pipe connecting said manifold with said valve, a fourth pipe connecting said valve with the said end of said cylinder, a fifth pipe connecting said valve with the opposite end of said cylinder, said valve establishing communication at all times between the intake manifold and the atmosphere to permit a uniform amount of air to enter the engine at all times, which valve when in one position establishes communication between one end of the cylinder and the atmosphere while maintaining said end of the cylinder in communication with the intake manifold.

3. In combination with a motor vehicle including an internal combustion engine and brake mechanism, a cylinder, a piston reciprocally mounted in the cylinder, a connection between the piston and the brake mechanism whereby reciprocation of the cylinder will apply and release the brakes, a valve having ports in communication with the atmosphere, a pipe connecting the intake manifold of said engine with one end of said cylinder, a check valve in said pipe preventing fluid flow to said end of the cylinder, a second pipe connecting said first pipe with said valve, a third pipe connecting said manifold with said valve, a fourth pipe connecting said valve with the said end of said cylinder, a fifth pipe connecting said valve with the opposite end of said cylinder, said valve being adapted when in one position to permit equal suction force within the cylinder on opposite sides of the piston, when in one position to communicate the portion of the cylinder on one side of the piston with the atmosphere while maintaining said portion of the cylinder in communication with the intake manifold, and said valve providing for introduction of atmospheric air into one of said pipes at all times regardless of the position of the valve.

4. In combination with a motor vehicle including an internal combustion engine and brake mechanism, a cylinder, a piston reciprocally mounted in the cylinder, a connection between the piston and the brake mechanism whereby reciprocation of the cylinder will apply and release the brakes, a valve having ports in communication with the atmosphere, a pipe connecting the intake manifold of said engine with one end of said cylinder, a check valve in said pipe preventing fluid flow to said end of the cylinder, a second pipe connecting said first pipe with said valve, a third pipe connecting said manifold with said valve, a fourth pipe connecting said valve with the said end of said cylinder, a fifth pipe connecting said valve with the opposite end of said cylinder, said valve being adapted when in one position to permit of an equal suction force within the cylinder on opposite sides of the piston, when in another position to communicate the portion of the cylinder on one side of the piston with the atmosphere while maintaining said portion of the cylinder in communication with the intake manifold, said valve permitting introduction of atmospheric air through one of said pipes through the intake manifold regardless of the position of the valve.

5. In combination with a motor vehicle including an internal combustion engine and brake mechanism, a cylinder, a piston reciprocally mounted in the cylinder, a connection between the piston and the brake mechanism whereby reciprocation of the cylinder will apply and release the brakes, a valve having ports in communication with the atmosphere, a pipe connecting the intake manifold of said engine with one end of said cylinder, a check valve in said pipe preventing fluid flow to said end of the cylinder, a second pipe connecting said first pipe with said valve, a third pipe connecting said manifold with said valve, a fourth pipe connecting said valve with the said end of said cylinder, a fifth pipe connecting said valve with the opposite end of said cylinder, said valve normally permitting atmospheric air to enter the manifold through said third pipe and adapted upon being moved progressively to first shut-off communication of said third pipe with the atmosphere and permit atmospheric air to enter the manifold through said first and second pipes and then permit atmospheric air to enter one end of the cylinder through said fifth pipe.

6. In combination with a motor vehicle including an internal combustion engine and brake mechanism, a cylinder, a piston reciprocally mounted in the cylinder, a connection between the piston and the brake mechanism whereby reciprocation of the cylinder will apply and release the brakes, a valve having ports in communication with the atmosphere, means forming fluid communication between said manifold, said valve and opposite ends of said cylinder, a by-pass between said valve and fluid communicating means between the manifold and cylinder, a check valve in said last named means between the by-pass and cylinder, said valve being operable to connect said fluid communicating means in several combinations, said valve being adapted to permit of a constant flow of atmospheric air to said manifold at all times.

7. In combination with a motor vehicle including an internal combustion engine and brake mechanism, a cylinder, a piston reciprocally mounted in the cylinder, a connection between the piston and the brake mechanism whereby reciprocation of the cylinder will apply and release the brakes, a valve having ports in communication with the atmosphere, means forming fluid communication between said manifold, said valve and opposite ends of said cylinder, a by-pass between said valve and fluid communicating means between the manifold and cylinder, a check valve in said last named means between the by-pass and cylinder, said valve being operable to gradually change the flow conditions in said fluid communicating means and adapted to permit a constant flow of atmospheric air to said manifold at all times.

FRANCIS K. GRUSS.